(12) United States Patent
Kashima et al.

(10) Patent No.: US 9,134,571 B2
(45) Date of Patent: Sep. 15, 2015

(54) LIQUID CRYSTAL PANEL AND DISPLAY DEVICE

(71) Applicant: BOE TECHNOLOGY GROUP CO., LTD., Beijing (CN)

(72) Inventors: Miki Kashima, Beijing (CN); Teruaki Suzuki, Beijing (CN); Guangkui Qin, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 36 days.

(21) Appl. No.: 14/057,122

(22) Filed: Oct. 18, 2013

(65) Prior Publication Data

US 2014/0111744 A1 Apr. 24, 2014

(30) Foreign Application Priority Data

Oct. 19, 2012 (CN) .......................... 2012 1 0401240

(51) Int. Cl.
*G02F 1/1335* (2006.01)
*G02F 1/13363* (2006.01)

(52) U.S. Cl.
CPC ...... *G02F 1/13363* (2013.01); *G02F 1/133555* (2013.01); *G02F 2001/133531* (2013.01); *G02F 2001/133633* (2013.01); *G02F 2413/04* (2013.01)

(58) Field of Classification Search
USPC ............................................ 349/99, 102–103
See application file for complete search history.

(56) References Cited

U.S. PATENT DOCUMENTS

| | | | |
|---|---|---|---|
| 2002/0159007 A1 | 10/2002 | Suzuki et al. | |
| 2004/0119920 A1 * | 6/2004 | Uesaka et al. | 349/114 |
| 2006/0119773 A1 | 6/2006 | Naka | |

FOREIGN PATENT DOCUMENTS

| | | |
|---|---|---|
| CN | 1786794 A | 6/2006 |
| JP | 2004-125830 A | 4/2004 |

OTHER PUBLICATIONS

First Chinese Office Action dated Aug. 1, 2014; Appln. No. 201210401240.3.

* cited by examiner

*Primary Examiner* — Wen-Ying P Chen
(74) *Attorney, Agent, or Firm* — Ladas & Parry LLP

(57) ABSTRACT

A liquid crystal panel and a display device are disclosed. In the liquid crystal panel, the first anisotropic optical layer comprises a first phase difference film and a second phase difference film, the second anisotropic optical layer comprises a liquid crystal film and a third phase difference film, wherein an orientation of liquid crystals in the liquid crystal film and an orientation of the liquid crystal layer are parallel to each other, a slow axis direction of the second phase difference film is vertical to the orientation of liquid crystals in the liquid crystal film.

7 Claims, 2 Drawing Sheets

LIQUID CRYSTAL PANEL AND DISPLAY DEVICE

FIELD OF THE ART

Embodiments of the invention relate to the technical field of liquid crystal displays, more particularly, to a liquid crystal panel and a display device.

BACKGROUND

Liquid Crystal displays (LCDs) has the advantages of compact, low power consumption and radiation-less. The LCDs are developed rapidly over the past years and are in a leading position in the present flat-panel display market. Currently, the LCDs are employed in products of various sizes and cover most electronic products in our information society, such as Liquid Crystal Televisions, High Definition Digital TVs, computers (desktop computers and notebooks), mobile phones, PDAs, GPSs, in-vehicle displays, projector displays, video recorders, digital cameras, digital watches, calculators, electrical instruments, meters, public displays and virtual displays. Such a position is non-achievable by any conventional display.

However, as liquid crystal materials do not produce light by themselves, a LCD is a passive display device and requires external light sources to realize display with a certain brightness and colors. According to the method of using the external light sources, the LCDs generally comprise Reflective LCDs (RE-LCDs), Transmissive LCDs (TS-LCDs) and Transflective LCDs (TR-LCDs). TR-LCDs may use the display mode of RE-LCDS in the case of having enough ambient light, which overcomes the disadvantage of blur display under strong ambient light of the TS-LCD and reduces the power consumption; while in a dark circumstance a backlight may be switched on. By using the TS-LCD display mode, the disadvantage of not able to display anything in dark environment is overcome.

In a TR-LCD, liquid crystals and phase difference films are normally combined. Specifically, in a display portion of the TR-LCD, liquid crystal elements are sandwiched between a pair of phase difference films to form a laminated structure, polarizing films or protection films are further laminated to outer sides of the laminated phase difference films. The phase difference films that can be used together with the liquid crystal elements may produce phase differences by using difference in refraction indices, thereby improving viewing angles of the LCDs.

In conventional technologies, the TR-LCDs are normally realized by making an orientation of liquid crystals in liquid crystal films, an orientation of a liquid crystal layer and a slow axis direction of the phase difference film on top of the liquid crystal layer to be in the same direction, that is to say, the three layers are parallel to each other and having a 90 degrees or 45 degrees angle with a direction (which is normally a direction of a line connecting both eyes of a user under normal viewing situation) vertical to the orientation of the liquid crystal layer (refer to Japanese Patent publication No. 2004-125830A). Such a three layer parallel structure may maintain wide viewing angle of the LCD while realizing high contrast ratio. However, such a structure may cause the problem of color cast, especially yellow color cast, which is quite serious. The reason for the color cast issue is that the liquid crystal is a birefringent material, when being viewed from an oblique direction, refractive indices for light of different wavelengths are different, and the differences in refractive indices are different as well. After being refracted by the liquid crystal, the phase retardation value of the light are different, which will generate difference in the light intensity after being polarized by the polarizer, thereby producing color cast. In the U.S. patent application publication No. 2002/0159007A1, the color cast problem with the reflective LCDs are solved by a design which provides a polarizer, a quarter wavelength (¼λ) phase difference film and a half wavelength (½λ) phase difference film. This technique may achieve quite good color cast correction effect for RE-LCDs; however, the actual effect at the transmissive region of the TR-LCDs is not ideal.

SUMMARY

Embodiments of the invention provide a liquid crystal panel and a display device, which can effectively solve the color cast problem while not harming the performance.

In one aspect, the invention provides a liquid crystal panel, the liquid crystal panel comprises:

a first substrate and a second substrate, a liquid crystal layer sandwiched between the first substrate and the second substrate, a first anisotropic optical layer and a first polarizer both disposed on a side of the first substrate opposite to the liquid crystal layer, and a second anisotropic optical layer and a second polarizer disposed on a side of the second substrate opposite to the liquid crystal layer;

wherein the first anisotropic optical layer comprises a first phase difference film and a second phase difference film, the second anisotropic optical layer comprises a liquid crystal film and a third phase difference film; an orientation of liquid crystals in the liquid crystal film is parallel to an orientation of the liquid crystal layer, a slow axis direction of the second phase difference film is vertical to the orientation of the liquid crystals in the liquid crystal film and the orientation of the liquid crystal layer.

As an example, $\Delta$nd of the first phase difference film is 260~290 nm, $\Delta$nd of the second phase difference film is 155~170 nm, $\Delta$nd of the third phase difference film is 260~290 nm, wherein $\Delta$nd is a phase retardation value.

As an example, the liquid crystal panel further comprises a reflection plate disposed at interface of the second substrate in contact with the liquid crystal layer.

As an example, the liquid crystal layer comprises a reflective region and a transmissive region.

As an example, $\Delta$nd of liquid crystal element in the reflective region is 155~165 nm, $\Delta$nd of liquid crystal element in the transmissive region is 310~330 nm, wherein $\Delta$nd is the phase retardation value.

As an example, a direction vertical to the orientation of the liquid crystal layer is defined as 0° direction, an orientation of the second polarizer is −87° to −83°, an orientation of the third phase difference film is −22° to −18°, the orientation of the liquid crystals in the liquid crystal film is parallel to the orientation of the liquid crystal layer and is +88° to +92°, an orientation of the second phase difference film is −2° to +2°, an orientation of the first phase difference film is +58° to +62°, an orientation of the first polarizer is −17° to −13°.

As an example, the orientation of the second polarizer is −85°, the orientation of the third phase difference film is −20°, the orientations of the liquid crystals in the liquid crystal film and the liquid crystal layer are both +90°, the orientation of the second phase difference film is vertical to the orientations of the liquid crystal film and the liquid crystal layer and is 0°, the orientation of the first phase difference film is +60°, the orientation of the first polarizer is −15°.

In another aspect, the invention further provides a display device which comprises the above liquid crystal panel.

BRIEF DESCRIPTION OF THE DRAWINGS

In order to clearly illustrate the technical solution of the embodiments of the invention, the drawings of the embodiments will be briefly described in the following. It is obvious that the described drawings are only related to some embodiments of the invention and thus are not limitative of the invention.

DETAILED DESCRIPTION

Figure 1:
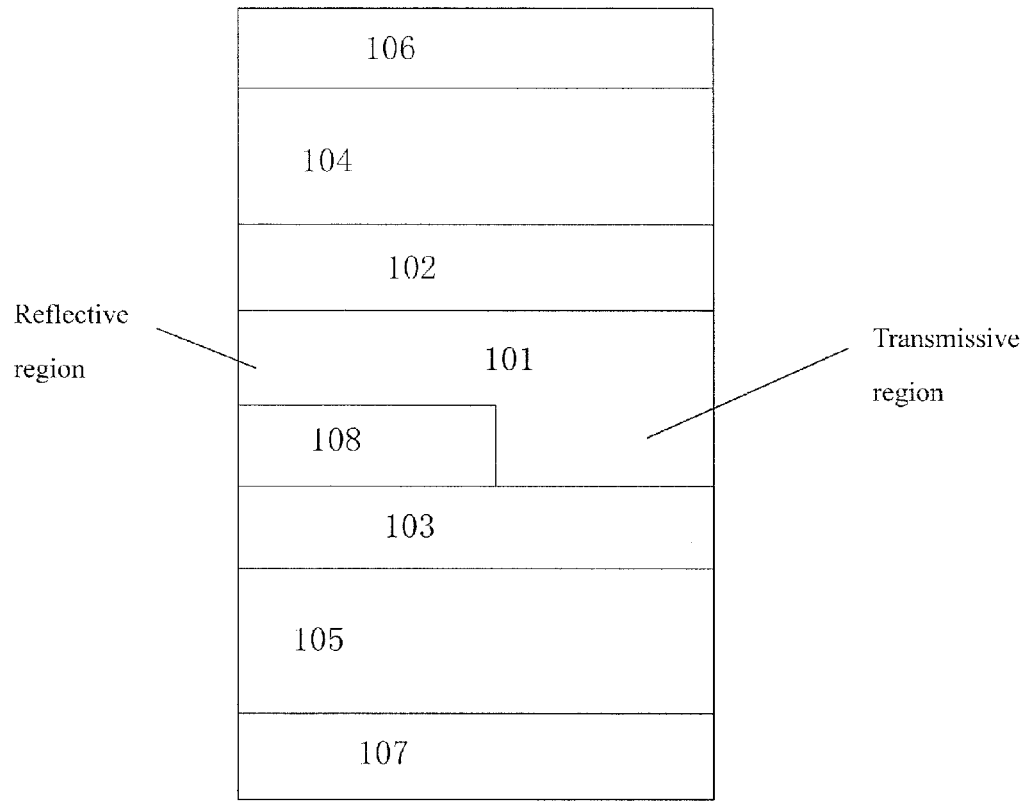
FIG. 1 schematically illustrates a configuration of a panel in a display device in accordance with an embodiment of the invention.

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at lease one. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In the following embodiments of the invention, orientations of anisotropic optical layers and an orientation of liquid crystals of a liquid crystal panel are designed such that the transflective LCDs has the effect of high contrast ratio, wide viewing angle in both the transmissive region and the reflective region; meanwhile, the color cast problem is corrected.

Embodiment 1

The embodiment provides a liquid crystal panel, comprising:

a first substrate and a second substrate, a liquid crystal layer sandwiched between the first substrate and the second substrate, a first anisotropic optical layer and a first polarizer disposed on a side opposite to the liquid crystal layer of the first substrate, and a second anisotropic optical layer and a second polarizer disposed on a side opposite to the liquid crystal layer of the second substrate;

wherein the first anisotropic optical layer comprises a first phase difference film and a second phase difference film, the second anisotropic optical layer comprises a liquid crystal film and a third phase difference film; an orientation of liquid crystals in the liquid crystal film is parallel to an orientation of the liquid crystal layer, a slow axis direction of the second phase difference film is vertical to the orientation of liquid crystals in the liquid crystal film and the orientation of the liquid crystal layer.

Embodiment 2

With reference to FIG. 1, a liquid crystal panel of the embodiment comprises:

a liquid crystal cell, which comprises a first substrate 102 and a second substrate 103 both having transparent electrodes, a uniformly oriented liquid crystal layer 101 sandwiched between the first substrate 102 and the second substrate 103. A reflective region (having a reflection function) and a transmissive region (having a transmission function) are formed in each pixel of the liquid crystal cell. The light exiting side of the liquid crystal panel is defined as the upper side. Disposed on the upper side of the first substrate 102 are a first anisotropic optical layer 104 and a first polarizer 106 disposed on the upper side of the first anisotropic optical layer 104; disposed on the lower side of the second substrate 103 are a second anisotropic optical layer 105 and a second polarizer 107 disposed on the lower side of the second anisotropic optical layer 107. Furthermore, with reference to FIG. 2, the first anisotropic optical layer 104 comprises a first phase difference film 104a and a second phase difference film 104b, the second anisotropic optical layer 105 comprises a liquid crystal film 105a and a third phase difference film 105b, wherein an orientation of the liquid crystals in the liquid crystal film 105a and an orientation of the liquid crystal layer 101 are parallel to each other, a slow axis direction of the second phase difference film 104b is vertical to the orientation of the liquid crystals in the liquid crystal film 105a and vertical to the orientation of the liquid crystal layer 101.

In the embodiment, the liquid crystal film 105 comprises two base films and liquid crystals sandwiched between the two base films, and functions as the phase difference film while improving the view angle. For example, for rod-shaped liquid crystals, the orientation of the liquid crystals in the liquid crystal film 105a is the long axis direction of the liquid crystals in the liquid crystal film 105a.

As an example, $\Delta$nd of the first phase difference film 104a in the first anisotropic optical layer 104 is 260~290 nm. $\Delta$nd of the second phase difference film 104b is 155~170 nm, $\Delta$nd of the third phase difference film 105b in the second anisotropic optical layer 105 is 260~290 nm, wherein $\Delta$nd is the phase retardation value. The phase retardation value is calculated via multiplying $\Delta$n by d and a physical quantity for measuring the phase difference, wherein $\Delta$n is $n_o - n_e$, $n_o$ and $n_e$ are respectively the refractive indices of ordinary light and extraordinary light, d is a thickness of the phase difference film.

Furthermore, in an example, the liquid crystal panel may further comprise a reflection plate 108 (i.e. a reflection electrode) disposed at interface of the second substrate 103 in contact with the liquid crystal layer 101, such that a reflective region is formed in the liquid crystal layer 101. For example, in the liquid crystal cell, the orientation of the liquid crystal layer 101 at interfaces where it contacts the first substrate 102 and the second substrate 103 is about 3°, the thickness of the reflective region is about 2.5 μm, $\varDelta$ nd of a liquid crystal element in the reflective region is about 160 nm, the thickness of the transmissive region is about 4.9 μm, $\varDelta$ nd of a liquid crystal element in the reflective region is about 320 nm. The above transflective LCD employs an electrically controlled birefringent (ECB) display mode where the liquid crystal molecules are uniformly oriented. ECB is a colorful liquid crystal display mode that may display a plurality of colors under the control of voltage. When an ECB LCD is powered on, an angle between the long axis of the liquid crystal molecules and the electric field varies according to different voltages, such that the birefringent index of the liquid crystal cell changes. When an incident linearly polarized white light enters the liquid crystal cell, it will form different elliptically-polarized light under different birefringent indices, thereby forming different colors. In the example, the first polarizer 106 and the second polarizer 107 are for example polarizer with a thickness of about 180 μm, the first anisotropic optical layer 104 has a first phase difference film 104a with a $\varDelta$ nd of about 270 nm and a second phase difference film 104b with a $\varDelta$ nd of about 160 nm, the second anisotropic optical layer 105 has a liquid crystal film 105a (such as a NM film made by Nippon Oil Corporation) and a third phase difference film 105b with a $\varDelta$ nd of about 270 nm.

Figure 2:
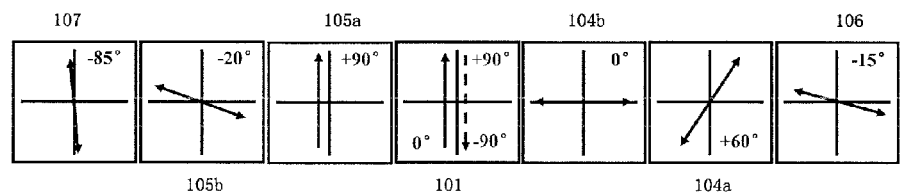
FIG. 2 schematically illustrates detailed orientations for each layer in a display device in accordance with an embodiment of the invention.

FIG. 2 illustrates detailed orientation angles of each layer in the liquid crystal panel of the embodiment. In FIG. 2, the solid arrow and the dashed arrow in the liquid crystal layer 101 represent rubbing orientation angles of the upper and lower substrate. In the embodiment, a direction vertical to the orientation of the liquid crystal layer 101 (which is normally a direction of a line connecting both eyes of a user under normal viewing situation) is defined as the 0° direction. For example, the orientation angles of FIG. 2 are those of each layer from top to bottom in the order of the laminated structure of FIG. 1: the orientation of the second polarizer 107 (i.e., the absorption axis direction) is −85°, the orientation of the third phase difference film 105b (i.e., the slow axis direction) is −20°, the orientations of the liquid crystal film 105a and the liquid crystal layer 101 are parallel to each other and both being +90°, the orientation of the second phase difference film 104b is vertical to that of the liquid crystal film 105a and the liquid crystal layer 101 and being 0°, the orientation of the first phase difference film 104a is +60°, the orientation of the first polarizer 106 is −15°. At this point, the color cast issue of the liquid crystal panel is corrected. In other embodiments of the invention, the orientation of the second polarizer 107 may be −87° to −83°, the orientation of the third phase difference film 105b may be −22° to −18°, the orientations of the liquid crystal film 105a and the liquid crystal layer 101 may be +88° to +92°, the orientation of the second phase difference film 104b may be −2° to +2°, the orientation of the first phase difference film 104a may be +58° to +62°, the orientation of the first polarizer 106 may be −17° to −13°. That is, for values in the above numerical ranges, the liquid crystal panel has good performance in viewing angel, contrast ratio and color cast effect. Here the positive values indicate angles rotated from the 0° towards the counter clockwise direction, the negative values indicate angles rotated from the 0° towards the clockwise direction. For example, "the orientation of the second polarizer 107 is −85°" means that the angle between the orientation of the second polarizer 107 and the 0° direction in the counter clockwise direction is 85°.

Figure 3:
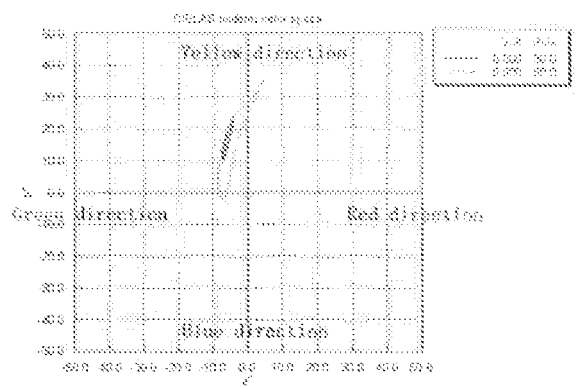
FIG. 3 schematically illustrates a color cast effect in a reflective region of a conventional panel.
Figure 4:
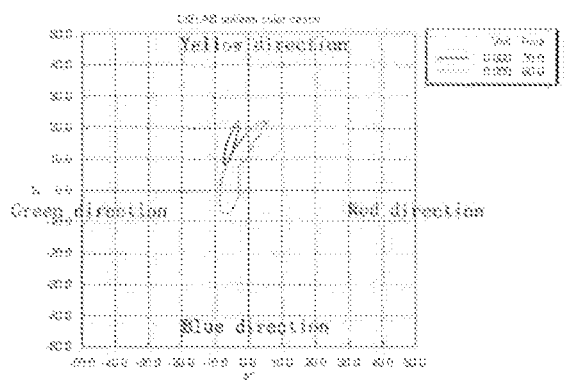
FIG. 4 schematically illustrates a color cast effect in a reflective region of a panel in accordance with an embodiment of the invention.

In the following, the technical effect of the display panel of the invention will be further described in comparison with conventional liquid crystal panels. In Japanese application publication No. 2004-125830A, an inclination direction of the liquid crystal film 105a (when seen from the plan view, the inclination direction of the liquid crystal film 105a is the same as the orientation of the liquid crystals in the liquid crystal film 105a), a direction of the pre-tilt angle of the liquid crystal layer (when seen from the plan view, the direction of the pre-tilt angle of the liquid crystal layer is parallel to the orientation of the liquid crystal layer) are the same as (that is, parallel to each other) the slow axis direction of the phase difference film on the liquid crystal layer. The reflective region of the panel made in this way has a color cast effect as illustrated in FIG. 3. The reflective region of the panel in accordance with the embodiment has a color cast effect as illustrated in FIG. 4. Panels obtained in both ways have a contrast ratio of more than 10 for each viewing angle, and the viewing angles of both panels are good. As illustrate in FIG. 3, for a 60° polar angle, the color cast is in the yellow direction, the maximum value of contrast ratio in the yellow direction is larger than 35. As illustrated in FIG. 4, for a 60° polar angle, the maximum value of contrast ratio in the yellow direction is less than 23. Generally, when the digit in the horizontal axis is larger, the color cast is redder, when the digit in the horizontal axis is smaller, the color cast is greener. When the digit in the vertical axis is larger, the color cast is yellower, when the digit in the vertical axis is smaller, the color cast is bluer. By comparing FIG. 3 and FIG. 4 it is seen that the color cast effect of the display panel of the embodiment is improved. It is seen through comparison that the display panel of the embodiment overcomes the disadvantages of the conventional technology and solve the color cast issue by means of optical compensation, thereby achieving transflective LCDs with high contrast ratio, good viewing angle and good color cast.

Embodiment 3

The embodiment provides a display device which comprises the liquid crystal panel of any of the above embodiments. For example, the display device may comprise a backlight module, a liquid crystal panel disposed at the light exiting side of the backlight panel and a frame structure supporting the backlight module and the liquid crystal panel.

The display device of the embodiment can be for example a display screen of a compute or a TV, or a display screen of mobile terminals such as a mobile phone.

The above embodiment makes the display device to have high contrast ratio, good viewing angle and color cast in both the reflective region and the transmissive region by changing the slow axis direction of the phase difference film on the liquid crystal layer.

What are described above is related to the illustrative embodiments of the disclosure only and not limitative to the scope of the disclosure; the scopes of the disclosure are defined by the accompanying claims.

What is claimed is:

1. A liquid crystal panel, comprising:
    a first substrate and a second substrate, a liquid crystal layer sandwiched between the first substrate and the second substrate, a first anisotropic optical layer and a first polarizer both disposed on a side of the first substrate opposite to the liquid crystal layer, and a second anisotropic optical layer and a second polarizer disposed on a side of the second substrate opposite to the liquid crystal layer;

wherein the first anisotropic optical layer comprises a first phase difference film and a second phase difference film, the second anisotropic optical layer comprises a liquid crystal film and a third phase difference film; an orientation of liquid crystals in the liquid crystal film is parallel to an orientation of the liquid crystal layer, a slow axis direction of the second phase difference film is vertical to the orientation of the liquid crystals in the liquid crystal film and the orientation of the liquid crystal layer, wherein a direction vertical to the orientation of the liquid crystal layer is defined as 0° direction, an orientation of the second polarizer is −87° to −83°, an orientation of the third phase difference film is −22° to −18°, the orientation of the liquid crystals in the liquid crystal film is parallel to the orientation of the liquid crystal layer and is +88° to +92°, an orientation of the second phase difference film is −2° to +2°, an orientation of the first phase difference film is +58° to +62°, an orientation of the first polarizer is −17° to −13°.

2. The liquid crystal panel of claim 1, wherein $\Delta$nd of the first phase difference film is 260~290 nm, $\Delta$nd of the second phase difference film is 155~170 nm, $\Delta$nd of the third phase difference film is 260~290 nm, wherein $\Delta$nd is a phase retardation value.

3. The liquid crystal panel of claim 1, further comprising a reflection plate disposed at interface of the second substrate in contact with the liquid crystal layer.

4. The liquid crystal panel of claim 1, wherein the liquid crystal layer comprises a reflective region and a transmissive region.

5. The liquid crystal panel of claim 4, wherein $\Delta$nd of liquid crystal element in the reflective region is 155~165 nm, $\Delta$nd of liquid crystal element in the transmissive region is 310~330 nm, wherein $\Delta$nd is the phase retardation value.

6. The liquid crystal panel of claim 1, wherein the orientation of the second polarizer is −85°, the orientation of the third phase difference film is −20°, the orientations of the liquid crystals in the liquid crystal film and the liquid crystal layer are both +90°, the orientation of the second phase difference film is vertical to the orientations of the liquid crystal film and the liquid crystal layer and is 0°, the orientation of the first phase difference film is +60°, the orientation of the first polarizer is −15°.

7. A display device comprising the liquid crystal panel of claim 1.

* * * * *